United States Patent [19]

Crabiel

[11] 4,177,869
[45] Dec. 11, 1979

[54] SWIVEL JOINT FOR A VEHICLE

[75] Inventor: Wesley I. Crabiel, Galion, Ohio

[73] Assignee: Dresser Industries, Inc., Dallas, Tex.

[21] Appl. No.: 898,679

[22] Filed: Apr. 21, 1978

[51] Int. Cl.$^2$ .............................................. B62D 27/00
[52] U.S. Cl. ..................................... 180/6.58; 212/30; 339/8 A
[58] Field of Search ................... 180/6.58, 45; 212/28, 212/30, 38; 339/8 A, 8 R

[56] References Cited

U.S. PATENT DOCUMENTS

| 2,254,192 | 8/1941 | White ................................. 180/6.58 |
| 2,281,288 | 4/1942 | Hettelsater ........................ 180/6.58 |
| 3,489,235 | 1/1970 | Watson ........................... 180/6.58 X |

Primary Examiner—Joseph F. Peters, Jr.
Assistant Examiner—Michael Mar
Attorney, Agent, or Firm—Burns, Doane, Swecker & Mathis

[57] ABSTRACT

The invention concerns a vehicle of the type comprising a mobile carrier, a pedestal mounted thereon for rotation about a vertical axis, and a swivel joint connected between the pedestal and the carrier and through which energy is transmitted. The swivel joint comprises a stationary sleeve mounted on the carrier along the vertical axis and a rotary sleeve mounted coaxially around the exterior of the stationary sleeve. The stationary sleeve includes a plurality of passages extending parallel to the axis for transmitting pressurized fluid. The rotary sleeve includes a plurality of fluid ports. The stationary sleeve includes an annular channel, for each passage, communicating the fluid port with the passage during rotation of the pedestal. An upper gear box is mounted at an upper end of the rotary sleeve for rotation therewith, and a lower gear box is mounted at a lower end of the stationary sleeve. A hollow vertical shaft extends coaxially through the stationary and rotary sleeves for transmitting mechanical energy. Upper gears in the upper gear box connect the shaft to a rotary mechanism on the pedestal. Lower gears in the lower gear box connect the shaft to a rotary mechanism on the carrier. A tube extends coaxially through the vertical shaft for receiving a plurality of electrical conductors which conduct electrical energy between the pedestal and carrier.

10 Claims, 4 Drawing Figures

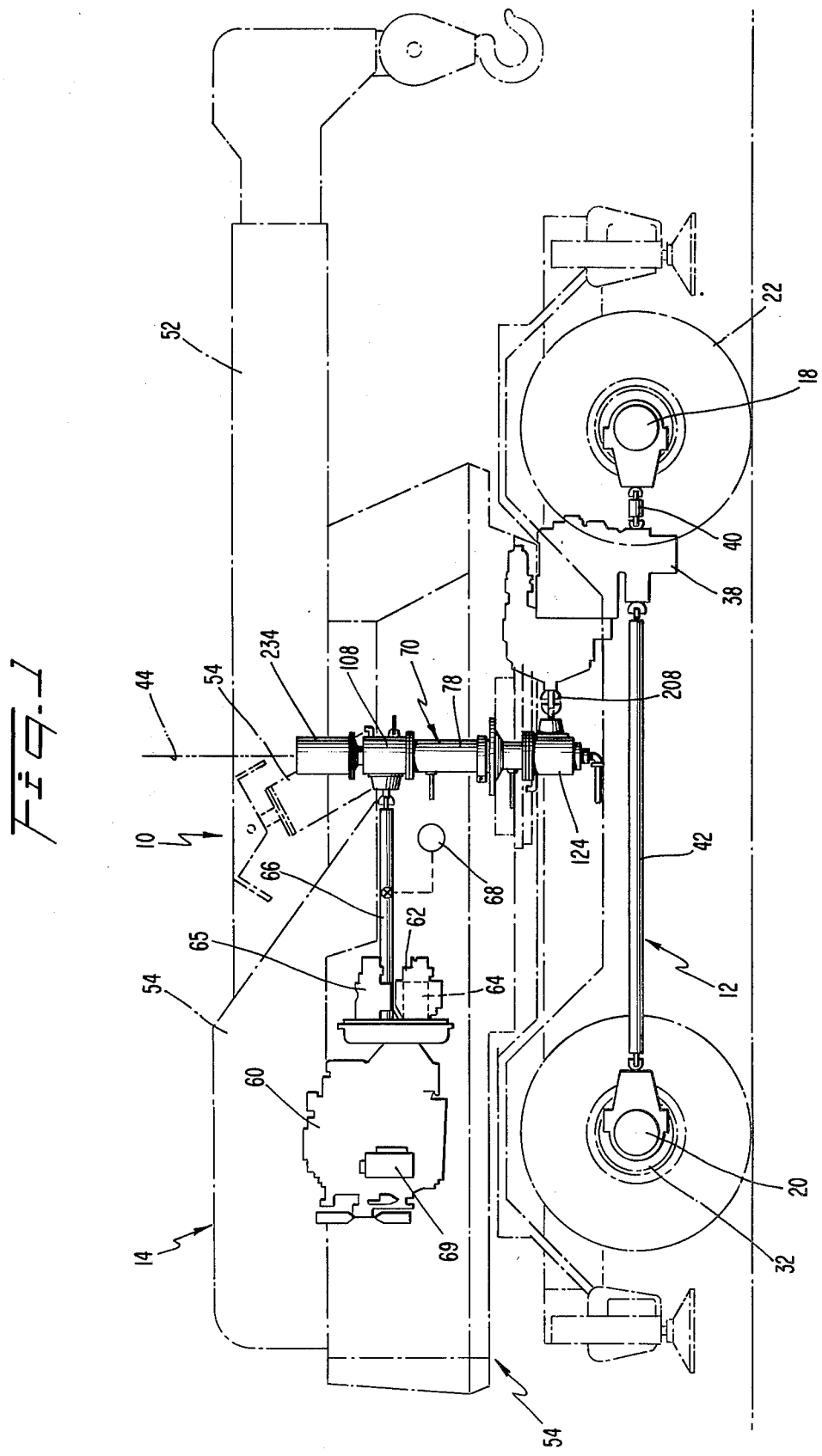

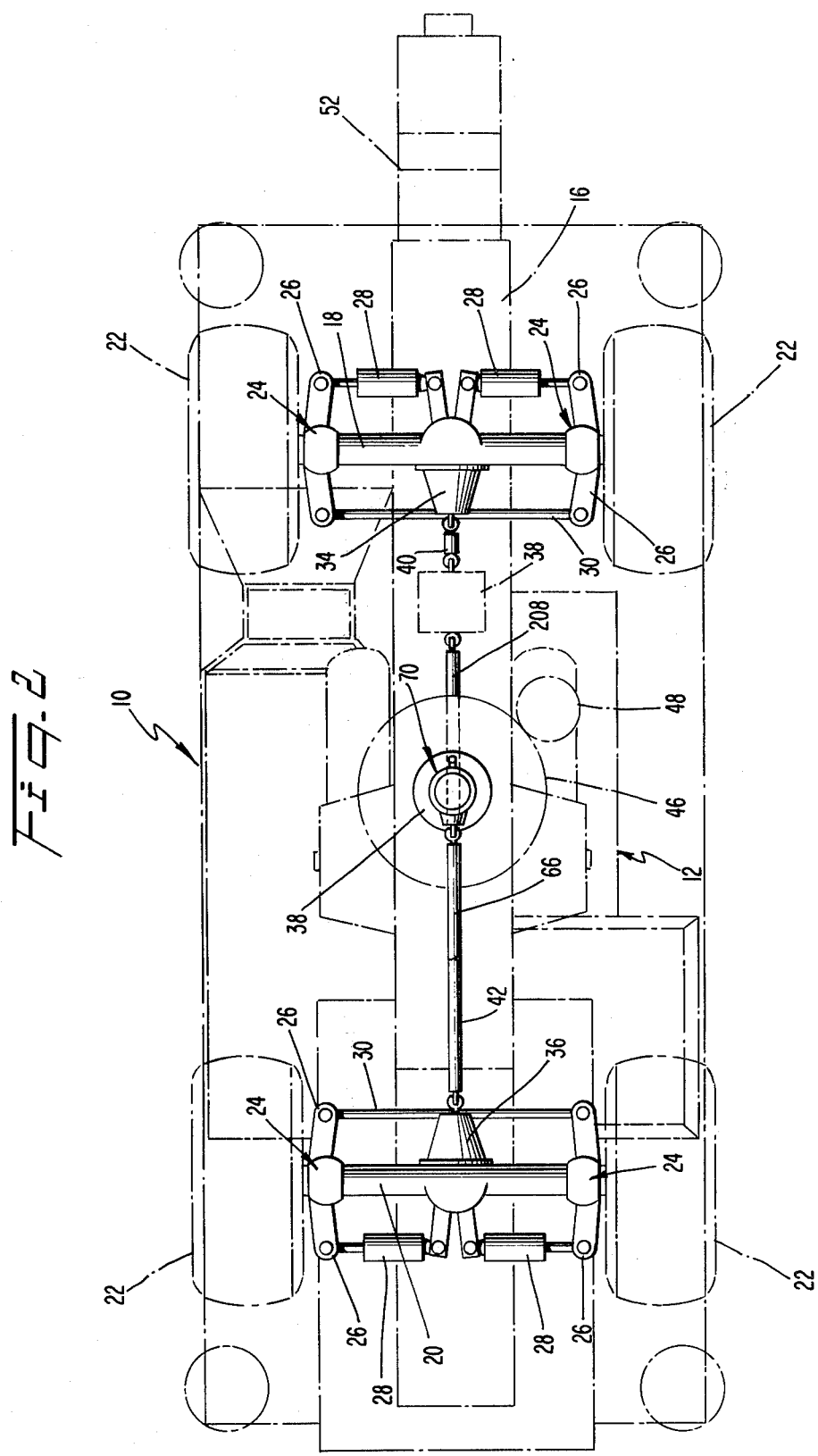

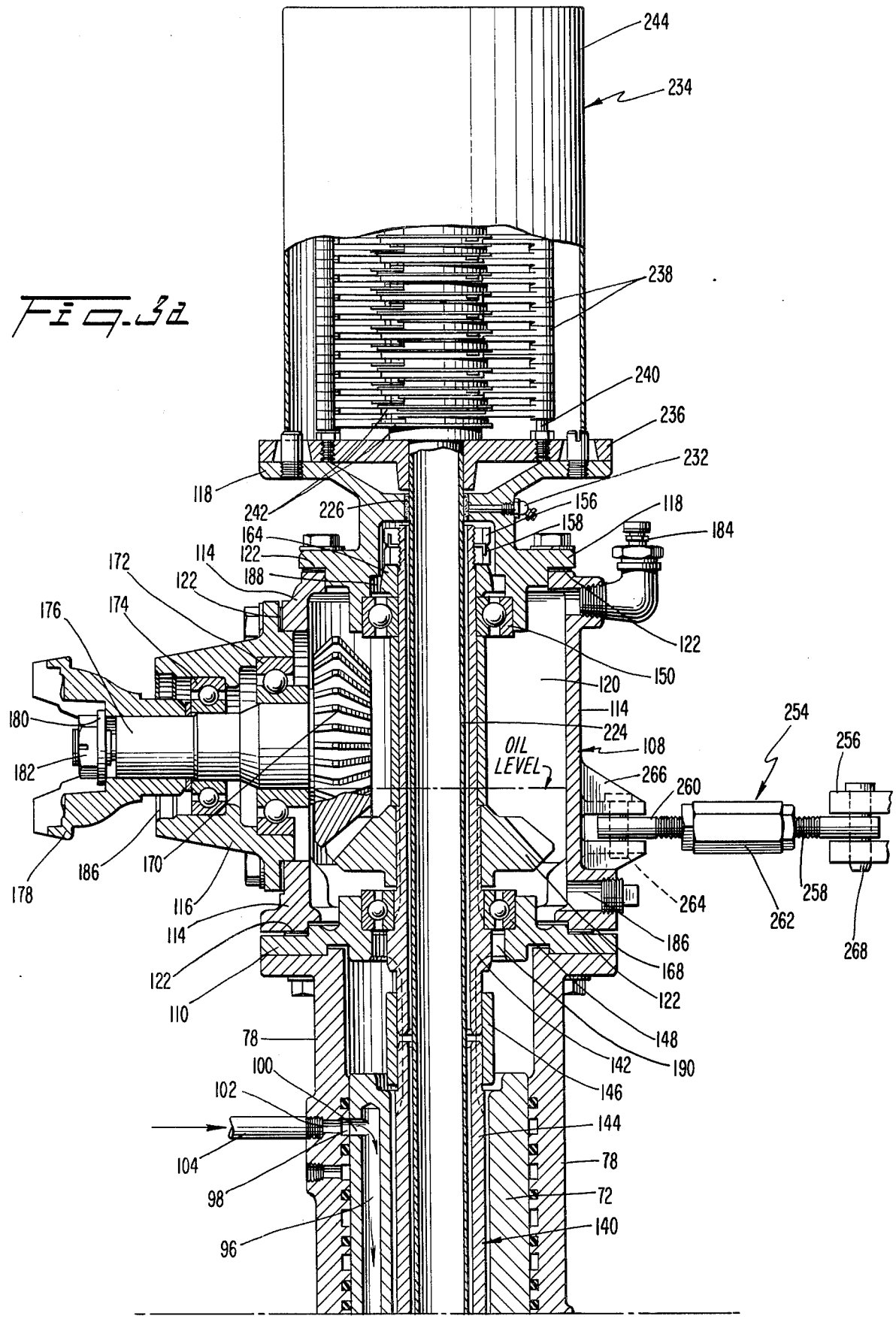

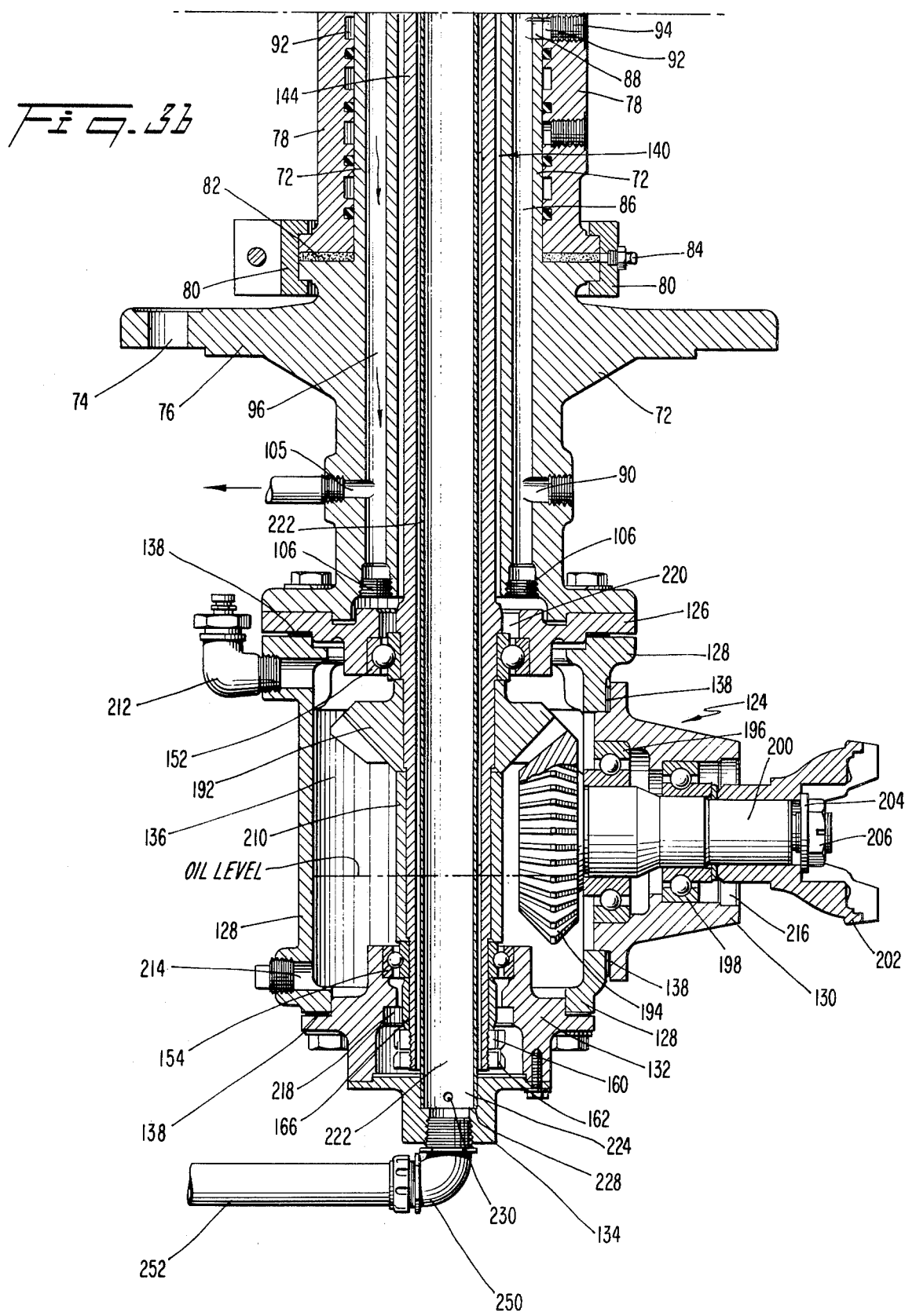

SWIVEL JOINT FOR A VEHICLE

BACKGROUND AND OBJECTS OF THE INVENTION

The present invention relates to power transmission apparatus and, more particularly, to a swivel joint for a heavy duty working vehicle, such as a crane, for simultaneously transmitting different forms of energy between a mobile carrier and a pedestal mounted thereon.

Heavy duty working vehicles such as a crane generally comprise a mobile carrier and a pedestal or superstructure carried thereby for rotation about a vertical axis. The pedestal and carrier each carry various types of power actuated mechanisms. For example, the pedestal typically carries a boom with hydraulic cylinders for adjusting the elevation thereof, a hoist motor for winding-up and paying-out cable which passes around sheaves on the boom, and a motor for rotating the pedestal. The carrier typically carries wheels with power steering and power braking mechanisms, and a transmission for conducting traction power to the wheels.

These mechanisms utilize different forms of energy which are generated by an engine, mounted on either the carrier or pedestal. Energy is transmitted to the other unit through a swivel joint connected therebetween in a manner permitting the pedestal to rotate without interferring with the transmission of energy. Exemplary of swivel joints are those described in U.S. Pat. No. 2,254,192 issued to White on Aug. 26, 1941 and U.S. Pat. No. 2,281,288 issued to Hettelsater on Apr. 28, 1942 which are designed to transmit fluid and mechanical power between a mobile carrier and pedestal.

There remains significant room for improvement in the design of swivel joints, especially as regards their versatility and size. That is, it is desirable that a swivel joint be able to simultaneously transmit electrical energy as well as fluid and mechanical energy. It is also desirable that a swivel joint be durable, relatively compact in size, and easily assembled and disassembled to facilitate maintenance. Swivel joints heretofore proposed exhibit definite shortcomings in this regard. For example, swivel joints have been previously proposed which include mechanical gearing, but no provision for lubrication thereof, thereby adversely affecting the life span of the joint.

It is, therefore, an object of the present invention to provide a novel swivel joint which obviates or minimizes problems of the types discussed above.

It is another object of the invention to provide a novel swivel joint capable of simultaneously transmitting mechanical, fluid, and electrical energy.

It is a further object of the invention to provide a novel swivel joint in which lubrication is continuously supplied to mechanically rotating elements.

It is an additional object of the invention to provide a novel swivel joint which is relatively compact in size and can be easily assembled and disassembled.

BRIEF SUMMARY OF A PREFERRED EMBODIMENT OF THE INVENTION

These objects are achieved in a vehicle of the type comprising a mobile carrier, a pedestal mounted thereon for rotation about a vertical axis, and a swivel joint connected between the pedestal and the carrier and through which energy is transmitted. The swivel joint comprises a stationary sleeve mounted on the carrier along the vertical axis and a rotary sleeve mounted coaxially around the exterior of the stationary sleeve. The stationary sleeve includes at least one fluid passage extending parallel to the axis for transmitting pressurized fluid. The rotary sleeve includes at least one fluid port. The stationary sleeve includes an annular channel for each passage communicating the fluid port with the passage during rotation of the pedestal. An upper gear box is mounted at an upper end of the rotary sleeve for rotation therewith, and a lower gear box is mounted at a lower end of the stationary sleeve. A hollow vertical shaft extends coaxially through the stationary and rotary sleeves for transmitting mechanical energy. Upper gears in the upper gear box connect the shaft to rotary means on the pedestal. Lower gears in the lower gear box connect the shaft to rotary means on the carrier. A tube extends coaxially through the vertical shaft for receiving a plurality of electrical conductors which conduct electrical energy between the pedestal and carrier.

THE DRAWINGS

Other objects and advantages of the present invention will become apparent from the following detailed description of a preferred embodiment thereof in connection with the accompanying drawings in which like numbers designate like elements and in which:

FIG. 1 is a side elevational view of a crane, drawn in phantom, which incorporates a novel swivel joint according to the present invention, depicted in solid lines in proportionally enlarged size along with other power units, FIG. 2 is a bottom view of the crane depicted in FIG. 1, and FIGS. 3a and 3b depict, in longitudinal vertical cross-section, a novel swivel joint according to the present invention, which figures are broken along a common horizontal match line.

DETAILED DESCRIPTION OF A PREFERRED EMBODIMENT OF THE INVENTOR

A crane 10 depicted in FIGS. 1 and 2 includes a mobile carrier 12 and a pedestal 14 mounted thereon. The carrier 12, which can be of conventional construction, comprises a frame 16 and front and rear axles 18, 20 carried by the frame. Each axle carries two wheels 22. Each wheel includes a ball and socket mounting 24. This mounting 24 includes lugs 26 connected to a hydraulic steering ram 28 such that extension or retraction of the steering ram 28 serves to steer the wheel. Interconnection between the front wheels and interconnection between the rear wheels for common movement can be effected by means of links 30 which are pivotally coupled to the lugs 26. At each wheel a conventional air drum brake mechanism 32 is provided.

The axles 18 are of a heavy duty planetary reduction type capable of supplying drive to each wheel. Front and rear differentials 34, 36 connect the axles 18, 20 to a main transmission 38 via drive shafts 40, 42. The transmission 38 is of a conventional type which supplies 4-wheel drive at low speed and 2-wheel drive at high speed. The power is continuously supplied to the transmission, as will be discussed, with the transmission including a standard electrical solenoid over air mechanism (not shown) for shifting between various speeds.

The pedestal 14 is mounted on the carrier 12 for rotation about a vertical axis 44. This is effected in conventional fashion by employing a main externally toothed gear 46 fixed on the carrier and a pinion 48 mounted on the pedestal and rotatably driven by a hydraulic motor. As the pinion is rotated, it travels around the main gear, and hence the pedestal rotates relative to the carrier.

A boom 52 is mounted on the pedestal frame 54 for rotary up and down movement about a horizontal axis. The boom may include several telescoping sections which are extended and retracted by a hydraulic crowd and retract mechanism. A pair of hydraulic lift cylinders 54 (only one shown) are connected between the pedestal frame and the boom for raising and lowering the boom.

The boom carries sheaves at the outer end thereof with cables extending from a main hoist motor and wrapped around the sheaves. Such structure is conventional and need not be discussed in further detail.

Mounted at a rear end of the pedestal is an engine 60 which can be of a diesel powered piston-cylinder type. The engine 60 drives a pair of variable volume hydraulic piston pumps 62, 64 which actuate the main hoist motor and the swing drive pinion, and a multiple element hydraulic gear pump 65 which actuates the boom crowd and retract motor, the boom lift cylinders 54, and the power steering rams 28 on the carrier. The engine 60 also powers an output shaft 66 for powering the carrier transmission 38, an electric generator 68 for operating the solenoid in the transmission, and an air pump 69 for operating the air brakes on the carrier 12.

In accordance with the present invention a swivel joint 70 is provided for transmitting mechanical, electrical, hydraulic, and pneumatic energy from the pedestal 14 to the carrier 12. More particularly, the swivel joint transmits mechanical energy to the transmission 38, electrical energy to the transmission solenoids, hydraulic energy to the power steering rams 28, and pneumatic energy to the air brakes 32.

Referring now to FIGS. 3a and 3b, the swivel joint 70 is depicted which comprises a main stationary sleeve 72 which is bolted to the carrier frame 16 by means of bolts (not shown) extending through holes 74 on a flange 76 which is integral with the main sleeve 72 (FIG. 3b). Telescopingly received over the main sleeve 72 is a rotary sleeve 78. An annular U-clamp 80 is provided for coupling a lower end of the rotary sleeve 78 to an upper end of the stationary sleeve 72 while permitting rotation therebetween about a vertical pivot axis. A thrust washer 82 is positioned between the rotary and stationary sleeves 78, 72 and a lubrication fitting 84 is mounted in the clamp 80 for the supply of lubricating medium between the sleeves 78, 72.

The stationary sleeve 72 contains a first fluid passage 86 extending therethrough in a direction parallel to the vertical rotary axis 44. The first fluid passage 86 includes an inlet 88 and an outlet 90. The rotary sleeve 78 includes an annular channel 92 which mates with the inlet 88 such that communication is continuously maintained therebetween. The annular channel 92 includes an entrance port 94 adapted to be connected to the end of a fluid hose. It is thus assured that fluid communication between the hose and passage 86 will be maintained in all of the various rotary positions of the pedestal 14. A fluid hose may be connected to the outlet 90 of the passage 86 and to a fluid actuated mechanism on the carrier 12.

As used herein, the term "fluid" is intended to cover both hydraulic and pneumatic forms of energy.

A second passage 96 is provided in the stationary sleeve 72 and extends parallel to the rotary axis 44. An annular channel 98 (FIG. 3a) in the rotary sleeve 78 is aligned with an entrance 100 of the passage 96. An entrance port 102 in the rotary sleeve 78 communicates with the annular channel 98 and accommodates connection of a fluid hose 104. Thus, the second passage 96 may be maintained continuously in fluid communication with the hose 104 during rotation of the rotary sleeve 78 to transmit fluid to an outlet 105 of the passage 96.

Plugs 106 are provided at the lower ends of the passages 86, 96 to prevent escape of fluid.

Connected to the upper end of the rotary sleeve 78 is an upper gear box 108 (FIG. 3a). This gear box 108 comprises a plate 110 which is fixedly bolted to the rotary sleeve 78. A housing 114 is fixedly bolted to the plate 110. One side of the housing contains an opening over which is bolted a frusto-conical ring 116. A top side of the housing contains an opening over which is bolted a retainer member 118. It will be appreciated that the plate 110, housing 114, ring 116, and retainer member 118 form a chamber 120 therewithin which contains a supply of lubricating oil. Suitable gaskets 122 are positioned between the adjoining surfaces of the chamber-forming elements to act as fluid seals.

Connected to the lower end of the stationary sleeve 72 is a lower gear box 124 (FIG. 3b). This gear box 124 includes a plate 126 fixedly bolted to the stationary sleeve 72. A housing 128 is fixedly bolted to the plate 126. One side of the shell 128 includes an opening over which is bolted a frusto-conical ring 130. An opening at a bottom side of the housing is covered by a bolted-on retainer member 132. A hollow end cap 134 is bolted to the retainer member 132. The lower plate 126, lower shell 128, lower ring 130, lower retainer member 132, and end cap 134 form a chamber 136 therewithin which contains lubricating oil. Suitable seal gaskets 138 are situated between adjoining surfaces of these chamber-forming elements to prevent leakage of oil.

Mounted for rotation about the vertical axis 44 is a hollow shaft 140 which extends axially through the rotary sleeve 78, the stationary sleeve 72, and the upper and lower gear boxes 108, 124. The shaft 140 comprises a pair of aligned upper and lower sections 142 (FIG. 3a), 144 (FIG. 3b) which are drivingly coupled together by a coupler ring 146 (FIG. 3a) that is splined to both shaft sections 142, 144. The upper shaft section 142 is rotatably supported by upper roller bearings 148, 150, one of which 148 is carried by the upper plate 110, and the other of which 150 is carried by the upper retainer member 118.

The lower shaft section 144 is rotatably supported by a pair of lower roller bearings 152, 154, one of which 152 is supported by the lower plate 126 and the other of which 154 is supported by the lower retainer member 132.

Lock nuts 156, 158 (FIG. 3a) are attached at the upper end of the upper shaft section 142, and lock nuts 160, 162 are attached at the lower end of the lower shaft section 144, to retain the shaft 140 in place. Spacers 164, 166 may be positioned between the respective lock nuts and bearings to transmit the locking action of the nuts.

Splined onto the upper shaft section 142 within the upper bear box 108 is a driven bevel gear 168. This gear 168 is in mesh with a drive bevel gear 170 that is rotatably supported by a pair of roller bearings 172, 174 carried by the upper frusto-conical ring 116. The drive gear 170 includes a horizontal stem 176 which extends through the bearings 172, 174. Splined onto the outer end of the stem is a yoke 178. A washer 180 and nut 182 serve to secure the yoke 178 on the stem 176. The yoke 178 is drivingly connected to the output shaft 66 of the engine in conventional fashion so as to impart rotary drive to the bevel gears 170, 168 and the hollow shaft 140.

Lubricating oil for the gears 168, 170 and bearings 148, 150, 172, 174 is maintained in the upper gear box chamber 120. This oil may be replenished through a fitting 184 which communicates with the top of the chamber, and drained through a normally plugged outlet 186.

Oil seals 186, 188, 190 are provided at the end of the frusto-conical ring 116 and behind the bearings 150, 148 to prevent oil leakage.

Splined onto the lower shaft section 144 (FIG. 3b) within the lower gear box 124 is a drive bevel gear 192. This gear 192 is in mesh with a driven bevel gear 194 that is rotatably supported by a pair of roller bearings 196, 198 carried by the lower frusto-conical ring 130. The driven gear 194 includes a horizontal stem 200 which extends through the bearings 196, 198. Splined onto the stem 200 is a yoke 202. A washer 204 and nut 206 serve to secure the yoke 202 on the stem 200. The yoke 202 is drivingly connected by an input shaft 208 to the transmission 38 on the carrier 12 in conventional fashion, so as to impart rotary drive thereto.

A spacer sleeve 210 is mounted on the lower shaft section 144 intermediate the drive gear 102 and the bearing 154 to aid in orienting these elements.

Lubricating oil for the gears 192, 194 and bearings 152, 154, 196, 198 is maintained in the lower gear box chamber 136. This oil may be replenished through a fitting 212 which communicates with the top of the lower chamber, and drained through a normally plugged outlet 214.

Oil seals 216, 218, 220 are provided at the rear end of the frusto-conical ring 130 and behind the bearings 154, 152 to prevent oil leakage.

It should be noted that any suitable type of bearings may be employed in the upper and lower gear boxes, such as tapered roller bearings for example.

Rotation of the hollow shaft 140 is continuously effected during operation of the crane. In this fashion, power is always available at the carrier transmission 38 for driving the wheels by suitable actuation of the electric solenoid-actuated mechanism.

The supply of electrical power to the solenoid mechanism and other electrical components of the carrier is effected by means of a plurality of electrical conductors 222 passing through a tube 224 which is axially situated within the hollow shaft 140. This tube 224 is supported by a bushing 226 carried by the upper retaining member 118, and sits on a shoulder 228 of the end cap 134 (FIG. 3b). The tube 224 is stationary in the sense that it does not rotate with the pedestal 14. A plurality of set screws 230 connect the tube 224 to the end cap 134. A grease fitting 232 is provided in the upper retaining member 118 to accommodate the delivery of lubrication to the bushing to minimize rotary friction between the tube 224 and bushing 226.

Connected at the upper end of the tube 224 is a conventional electrical collector ring assembly 234 which receives electrical energy from the engine-driven generator 68 and transmits such energy to the conductors 222 running through the tube 224. The collector ring assembly 234 includes a base 236 which is fixedly pinned to the upper retaining member 118. As is well known in the art, the collector ring assembly includes a series of wipers 238 carried by rods 240 that are mounted on the base 236. These wipers 238 are in contact with rings 242 carried by the tube 224. Hence, as the pedestal 14 rotates, the wipers 238 rotate with it while maintaining electrical contact with the rings 242. A cover 244 may be provided to shield the rings and wipers from dust, moisture, etc.

A fitting 250 is mounted within the end cap 134 (FIG. 3b) and a conduit 252 is attached to an exposed end of the fitting to receive and guide the electrical conductors 222.

The conductors 222 are adapted to conduct electrical energy generated by the generator 68 through conventional batteries, the latter supplying electrical power to the collector ring assembly.

A supply bar 254 (FIG. 3a) is secured between flanges 256 of the pedestal frame and the housing 114 of the swivel joint 70. The bar 254 comprises a pair of externally threaded rods 258, 260 which are received in an internally threaded sleeve 262. One of the rods 260 is coupled by a pin 264 to lugs 266 on the housing 108 and the other rod 258 is coupled by a pin 268 to the flanges 256 on the pedestal frame. Rotation of the sleeve 262 serves to increase or shorten the overall length of the bar 254. The adjustable bar maintains alignment of the yoke 178 in relation to the input drive shaft 66 and also acts as a torque reaction member, preventing rotation of the housing 108.

During operation of the crane 10, energy is supplied from the pedestal-mounted engine 60 to carrier-mounted mechanisms via the swivel joint 70. The output shaft 66 from the engine continuously rotates the hollow shaft 140 of the swivel joint 70 so that power is continuously supplied to the carrier transmission 38 for driving the wheels 22. Electrical energy for operating various electrical elements on the carrier including the solenoid mechanism of the transmission 28, is supplied by the electrical conductors 222 passing through the tube 224 of the swivel joint 70.

Steering and braking of the wheels 22 is effected by the supply of hydraulic and pneumatic energy through the passages 86, 96 in the stationary sleeve 72. The annular channels 92, 98 in the rotary sleeves 78 assure that the pedestal 14 can be rotated without interferring with energy transmission through these passages.

The various gears and bearings in the gear boxes 108, 124 are kept lubricated by oil carried in these gear boxes to assure efficient, long lasting operation, even at extended, high speed rotation of the shaft.

The swivel joint 70 may be easily assembled and disassembled. Since the hollow shaft 140 is separable at the coupler 146, the upper gear box 108 can be uncoupled from the rotary sleeve 78, or the rotary sleeve 78 can be uncoupled from the stationary sleeve 72. The uncoupled assembly can then be lifted from the stationary sleeve 72 as a unit. Assemblage of these parts is effected in the reverse manner.

The gear boxes 108, 124 are removable as units from the sleeves 140 to facilitate repair or replacement.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In a vehicle of the type comprising a mobile carrier, a pedestal mounted thereon for rotation about a vertical axis, and a swivel joint connected between said pedestal and said carrier and through which energy is transmitted, the improvement wherein said swivel joint comprises:

a stationary sleeve mounted on said carrier along said vertical axis;

a rotary sleeve mounted coaxially around the exterior of said stationary sleeve;

said stationary sleeve including a fluid passage extending parallel to said axis for transmitting pressurized fluid;

said rotary sleeve including a fluid port;

one of said sleeves including an annular channel communicating said fluid port with said passage during rotation of said pedestal;

an upper gear box mounted at an upper end of said rotary sleeve for rotation therewith, a lower gear box mounted at a lower end of said stationary sleeve;

a hollow vertical shaft extending coaxially through said stationary and rotary sleeves for transmitting mechanical energy;

upper gear means in said upper gear box for connecting said shaft to rotary means on said pedestal, and lower gear means in said lower gear box for connecting said shaft to rotary means on said carrier;

electrical connector means mounted adjacent one end of said shaft for rotation relative thereto, said connector means being connectable to electrical conductors said shaft including an open upper end and an open bottom end for receiving electrical conductors to conduct electrical energy between said pedestal and carrier.

2. Apparatus according to claim 1 including an electrical collector ring connected to said upper gear box for rotation therewith, said conductors being electrically connected to said collector ring, and a tube extending coaxially through said shaft for receiving the conductors.

3. Apparatus according to claim 1, including first upper bearing means mounted in said upper gear box and first lower bearing means mounted in said lower gear box, said hollow shaft being rotatably mounted by said upper and lower bearing means; second upper bearing means mounted in said upper gearbox, and second lower bearing means mounted in said lower gear box; a first upper gear mounted on said shaft in said upper gear box, a second upper gear mounted in said second upper bearing means in meshing engagement with said first upper gear about an axis transverse relative to said vertical axis; a first lower gear mounted on said shaft in said second gear box, a second lower gear mounted in said second lower bearing means in meshing engagement with said first lower gear and being rotatable about an axis extending transverse relative to said vertical axis, each gear box containing a supply of lubricating oil for lubricating said gears and bearing means.

4. Apparatus according to claim 1, wherein said shaft comprises separable upper and lower sections such that said rotary sleeve, upper gear box, and upper shaft section constitutes a unit for attachment to and removal from said stationary sleeve and lower shaft section.

5. Apparatus according to claim 3, wherein said upper gear box comprises a plate portion removably affixed to said rotary sleeve, a shell portion removably affixed to said plate portion, a top retainer removably affixed to said shell portion, and a side portion removably affixed over an opening in said shell portion; said second upper gear including a stem portion extending through said side portion, said second upper gear means being mounted in said side portion.

6. Apparatus according to claim 1, wherein said annular channel is formed in said rotary sleeve.

7. Apparatus according to claim 1, wherein said rotary sleeve and said stationary sleeve include annular shoulders, an annular clamp disposed around said shoulders to connect said sleeves together, and an axial thrust bearing disposed between said shoulders to facilitate relative rotation between said sleeves.

8. Apparatus according to claim 1, wherein said tube is affixed to said lower gear box such that said upper gear box is rotatable relative to said tube; said tube being mounted in a low-friction bushing in said upper gear box.

9. In a crane of the type comprising a carrier, a pedestal mounted on said carrier for rotation about a vertical axis, and a swivel joint connected between said pedestal and said carrier through which energy is transmitted; the improvement wherein:

said carrier includes steerable wheels, fluid cylinders for steering said wheels, air powered brakes for said wheels, and a transmission including an input and an output operably connected to said wheels, said transmission including electrically actuable means for selectively drivingly interconnecting said input and output to transmit power to said wheels, said pedestal including an engine for actuating hydraulic pump means, a pneumatic pump and an electrical power generating means, said engine including a power output shaft;

said swivel joint comprising:

a stationary sleeve mounted on said carrier along said vertical axis;

a rotary sleeve mounted concentrically around said stationary sleeve for relative rotation thereto;

means forming an upper hollow gear box affixed to said rotary sleeve for rotation therewith;

first upper bearing means mounted on said upper gear box in alignment with said vertical axis;

means forming a lower hollow gear box affixed to a lower end of said stationary sleeve;

first lower bearing means mounted on said lower gear box in alignment with said vertical axis;

a hollow vertical shaft extending coaxially through said stationary and rotary sleeves and rotatably mounted in said first upper and lower bearing means;

an upper driven gear mounted on said shaft within said upper gear box;

second upper bearing means mounted in said upper gear box;

an upper drive gear mounted in said second upper bearing means for rotation about an axis extending transversely relative to said vertical axis, said upper drive gear being in mesh with said upper driven gear and connectable with said engine output shaft to rotate said vertical shaft;

a lower driven gear mounted on said vertical shaft in said lower gear box;

second lower bearing means mounted in said lower gear box;

a lower driven gear mounted in said second lower bearing means for rotation about an axis extending transversely relative to said vertical axis, said lower driven gear being in mesh with said lower drive gear and connectable with said transmission input to drive the latter in response to rotation of said vertical shaft;

said upper and lower gear boxes each including a chamber containing lubricating oil for lubricating the bearing means and gears carried therein;

said stationary sleeve including first and second passages extending parallel to said vertical axis, said passages each including an upper inlet and a lower outlet, said outlet of said first passage being connected to said fluid steering cylinders and said outlet of said second passage being connected to said brakes;

said rotary sleeve including first and second annular channels formed on an interior periphery thereof, said channels being mutually axially spaced, said first channel communicating with said inlet of said first passage and said second channel communicating with said inlet of said second passage such that communication between said channels and passages is maintained during rotation of said rotary sleeve;

said first annular channel including an entrance opening for connection with said pneumatic pump for supplying pressurized air through said second passage to said brakes;

a tube extending axially through said vertical shaft and containing a plurality of electrical conductors; and a collector ring mounted atop said upper gear box for rotation therewith, said collector ring being connected to said electric power generating means and said conductors to transmit electric power from the former to the latter;

said conductors being connected to at least said electrically actuable means of said transmission.

10. Apparatus according to claim 9, wherein said hollow shaft comprises separable upper and lower sections such that said rotary sleeve, upper gear box and said upper shaft section constitutes a unit for removal from or connection to said stationary sleeve and said lower shaft section.

* * * * *